United States Patent
Roos et al.

(10) Patent No.: US 8,843,059 B2
(45) Date of Patent: Sep. 23, 2014

(54) SYSTEM AND METHOD FOR GATEWAY RF DIVERSITY USING A CONFIGURABLE SPOT BEAM SATELLITE

(75) Inventors: Dave Roos, Boyds, MD (US); Adrian Morris, Darnestown, MD (US); Stanley Kay, Rockville, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 395 days.

(21) Appl. No.: 13/285,467

(22) Filed: Oct. 31, 2011

(65) Prior Publication Data
US 2013/0109299 A1    May 2, 2013

(51) Int. Cl.
*H04B 7/185* (2006.01)

(52) U.S. Cl.
CPC ........ *H04B 7/18528* (2013.01); *H04B 7/18515* (2013.01); *H04B 7/18513* (2013.01)
USPC ............. 455/12.1; 455/13.1; 455/14; 455/20; 455/428; 455/3.01; 370/310; 370/315; 370/316; 370/323

(58) Field of Classification Search
CPC ........... H04B 7/18513; H04B 7/18515; H04B 7/2041; H04B 7/18517; H04B 7/18519
USPC ........... 455/12.1, 13.1, 14, 20, 427, 428, 429, 455/423–425, 67.11, 422.1, 403, 426.1, 455/426.2, 3.02, 3.01, 3.03; 370/310, 315, 370/316, 323
See application file for complete search history.

(56) References Cited

U.S. PATENT DOCUMENTS

2003/0109220 A1*  6/2003  Hadinger et al. ............ 455/13.1
2005/0136836 A1*  6/2005  Karabinis et al. ............ 455/12.1

* cited by examiner

*Primary Examiner* — Keith Ferguson
(74) *Attorney, Agent, or Firm* — K&L Gates LLP

(57) ABSTRACT

A system for gateway RF diversity using a configurable spot beam satellite including a satellite, a first gateway connected to a first VSAT population through the satellite by a first gateway spot beam and a first user spot beam set, a diversity gateway located outside of the first gateway spot beam for the first gateway, and a diversity control function to command the satellite to connect the first user spot beam set for the first gateway to a diversity gateway spot beam when the first gateway experiences service interruption.

23 Claims, 10 Drawing Sheets

SYSTEM AND METHOD FOR GATEWAY RF DIVERSITY USING A CONFIGURABLE SPOT BEAM SATELLITE

BACKGROUND

Satellite communication systems may be susceptible to various types of service disruption, such as that caused by, for example, rain fade attenuation. The higher frequencies used in modern high throughput satellite systems may be more attenuated by rain than are lower frequencies used in other systems. For example, rain attenuation may be more severe at Ka-band or V-band than at L-band or C-band. Rain fade at a satellite ground station, or gateway, may reduce service availability for users in user spot beam sets served by that gateway. This may be partially mitigated, for example, through application of adaptive coding and modulation (ACM) techniques, which may apply robust modulation and/or coding when necessary to overcome atmospheric effects. This may provide improved link availability at the cost of reduced link capacity. Uplink power control (ULPC) systems may also be provided at a gateway's RF Terminal (RFT) to compensate for uplink attenuation by increasing uplink transmit power, and larger antennas may be provided in the RFT to compensate for both uplink and downlink attenuation. The provision of large antennas and amplifiers may be expensive, and even when coupled with ACM, may not provide the target service availability for sufficiently rainy gateway sites.

RF diversity may be used to remedy service interruptions. Some or all of the equipment at a first gateway site may be replicated at a second RF diversity gateway site within the same gateway spot beam as the first gateway site. To allow this, the gateway spot beam must be sufficiently large that the RF diversity gateway site can be established far enough away from the first gateway site so as to likely be out of the rain fade when the first gateway site suffers from rain fade, depending on the direction and size of typical storms in that area. A larger gateway spot beam may provide reduced availability and capacity of the gateway uplink and downlink for a fixed gateway antenna size, due to the broader focus of the gateway spot beam at the satellite. There may be limited infrastructure access that makes it difficult to find a cost-effective site for an RF diversity gateway within the gateway spot beam, due to lack of facilities, power, terrestrial communication access, staffing, security, and so on. For high capacity satellite systems that employ many gateway spot beams, the use of RF diversity gateways may result in an RF diversity gateway being replicated in each gateway spot beam where necessary to achieve the targeted service availability, resulting in considerable capital and operating costs for RF diversity sites.

BRIEF SUMMARY

It is an object of the present invention to provide a system and method for gateway RF diversity using a configurable spot beam satellite.

In accordance with an aspect of the present invention, a system for gateway RF diversity using a configurable spot beam satellite includes a satellite, a first gateway connected to a first VSAT population through the satellite by a first gateway spot beam and a first user spot beam set, a diversity gateway located outside of the first gateway spot beam for the first gateway, and a diversity control function to command the satellite to connect the first user spot beam set for the first gateway to a diversity gateway spot beam when the first gateway experiences service interruption.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Figure 1:
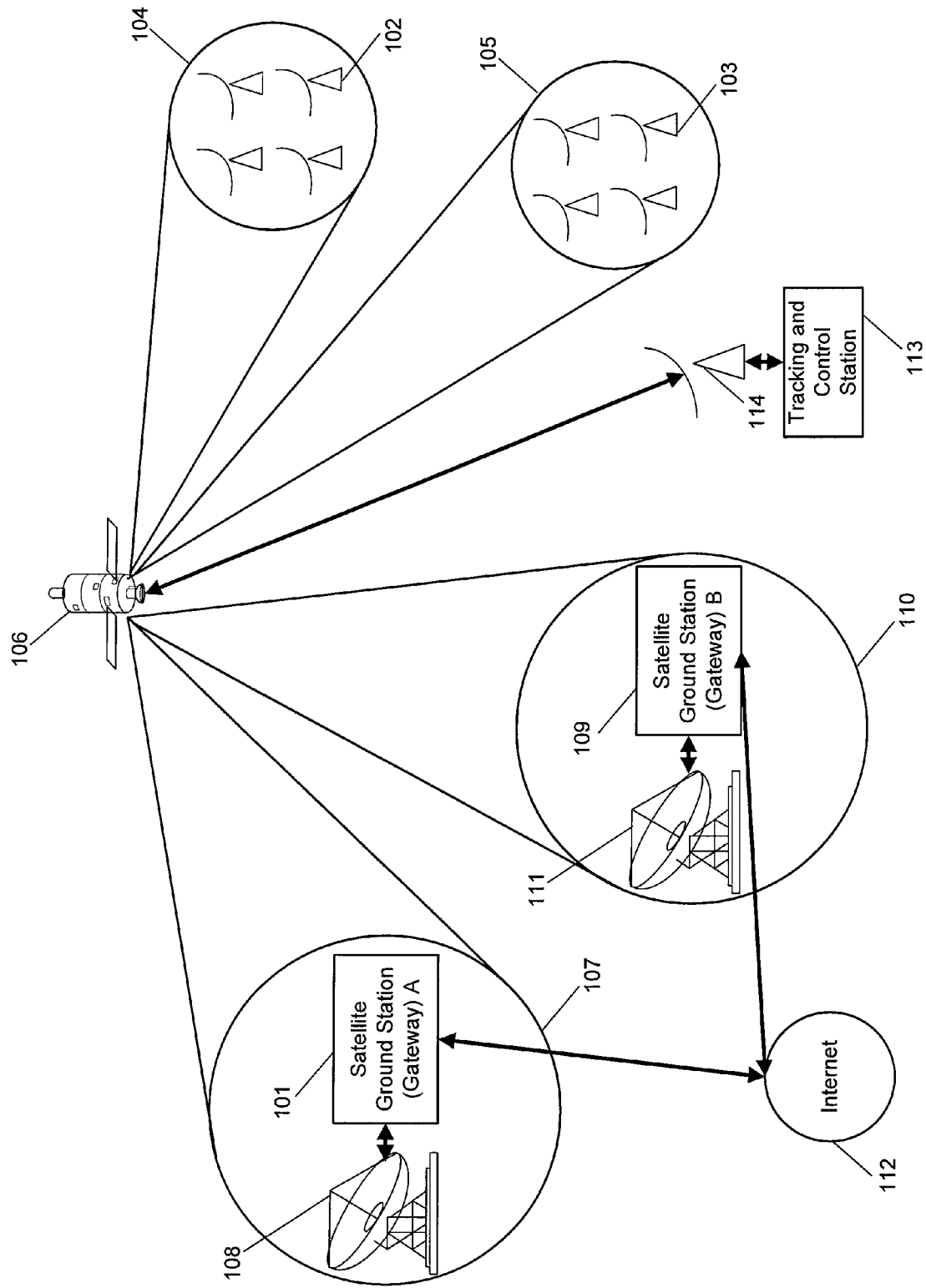
FIG. 1 depicts an exemplary satellite communications system.

FIG. 1 depicts an exemplary satellite communications system. The satellite communications systems may include a satellite ground station, or gateway, A 101, a Very Small Aperture Terminal (VSAT) population A 102, VSAT population B 103, a user spot beam set A 104, a user spot beam set B 105, a satellite 106, a gateway spot beam A 107, an RFT A 108, a gateway B 109, a gateway spot beam B 110, an RFT B 111, the internet 112, a telemetry, tracking and control station 113, and tracking and control RFT 114.

The gateway A 101 may be a satellite ground station, hub or gateway for a satellite communications system, and may be connected to the VSATs in the VSAT population A 102 through the satellite 106. Feeder links through the gateway spot beam A 107 may carry data between the gateway A 101 and the satellite 106, and may include a forward uplink for transmitting data from a gateway A 101 to the satellite 106, and a return downlink for transmitting data from the satellite 106 to a gateway A 101. The gateway B 109 may be similar to the gateway A 101, and may be connected to the VSATs in the VSAT population B 103. Data between the gateway B 109 and the satellite 106 may be carried through links in the gateway spot beam B 110. The gateway A 101 and the gateway B 109 may be high capacity, large antenna earth stations with connectivity to ground telecommunications infrastructure, such as, for example, the Internet 112.

The gateway A 101 may be connected to the RFT A 108, and the gateway B 109 may be connected to the RFT B 111. The RFT A 108 and the RFT B 111 may include an antenna, electronics and connectivity to allow for communications access to the satellite 106. The RFT A 108 and RFT B 111 may be the physical equipment responsible for the sending and receiving of signals to and from the satellite 106.

The VSAT population A 102 and the VSAT population B 103 may include a number of VSATs, which may be used by end users to access the satellite communications system. A VSAT may include a remote satellite dish for receiving RF signals from and transmitting RF signals to the satellite 106, a satellite modem and other equipment for managing the sending and receiving of data, and one or more remote hosts, which may be computer systems or other electronic devices capable of network communications at a site remote from the gateway A 101 and the gateway B 109. For example, a VSAT may be used at a residence or place of business to provide access to the Internet 112. User broadband links through the user spot beam set A 104 may carry data between the satellite 106 and the VSAT population A 102 and may include a return uplink for transmitting data from a VSAT to the satellite 106, and a forward downlink for transmitting data from the satellite 106 to a VSAT. The user broadband links may enable the provision of broadband service to the VSATs in the VSAT population A 102. User broadband links through the user spot beam set B 105 may carry data between the satellite 106 and the VSAT population B 103.

The satellite 106 may be any suitable communications satellite for connecting a gateway, such as, for example, the gateway A 101, to a VSAT population, such as, for example, the VSAT population A 102. The satellite 106 may use small spot beams to optimize capacity and availability for user terminal and gateway access, with uplink and downlink frequencies reused between spot beams in a pattern to maximize capacity and coverage while minimizing co-frequency interference. Gateway coverage may be provided by gateway spot beams, such as, for example, the gateway spot beam A 107 and the gateway spot beam B 110. The gateway A 101 may be located within the gateway spot beam A 107, and the gateway B 109 may be located within the gateway spot beam 110. The satellite 106 may provide user terminal coverage in two or more user spot beams, such as, for example, user spot beams in the user spot beam set A 104, and the user spot beam set B 105. The VSAT population A 102 may be covered by the spot beams in the user spot beam set A 104, and the VSAT population B 103 may be covered by the spot beams in the user spot beam set B 105.

Each gateway spot beam may be connected through the satellite 106 to a user spot beam set, and each user spot beam set may be connected to a given gateway spot beam. For example, the gateway spot beam A 107 may be connected to the user spot beam set A 104, and the gateway spot beam B 110 may be connected to the user spot beam set B 105. Any suitable number of spot beams may be used in a user spot beam set, and different numbers of spot beams may be used in different user spot beam sets. Spot beams within a user spot beam set may be adjacent, overlapping, or dispersed through the user terminal coverage area.

The satellite 106 may provide bent-pipe or regenerative connectivity between spots beams in user spot beam sets and gateway spot beams. A given uplink frequency band from a given spot beam in a user spot beam set may be translated into a given downlink frequency band of a given gateway spot beam, and similarly, a given uplink frequency band from a given gateway spot beam may be translated into a given downlink frequency band of a given spot beam in a user spot beam set. The satellite 106 may alternatively be part of a unidirectional satellite communications system. The satellite 106 may alternatively be a regenerative spot beam satellite with onboard demodulation and remodulation, such as Spaceway-3.

The satellite 106 may use spot beams and frequency and polarization reuse to maximize the total capacity of the system. Signals passing through the satellite 106 in the forward direction, towards the VSATs, may be based on the DVB S.2 standard (ETSI EN 302 307) using signal constellations up to and including 32-APSK. The signals intended to pass through the satellite 103 in the return direction, toward the hubs, may be based on the IPoS standard (ETSI TS102 354). Other suitable signal types may also be used in either direction, including, for example DVB-RCS, DVB-RCS2, or proprietary formats.

The gateway A 101 may be connected to the Internet 112. Remote devices connected to VSATs in the VSAT population A 102 may connect to the Internet 112 through the satellite 106 and the gateway A 101. Data sent from the VSAT to the Internet 112 may be transmitted to the satellite 106, then from the satellite 106 to the gateway A 101. The gateway A 101 may then transmit the data to the Internet 112. Data from the Internet 112 may be sent to a VSAT in the VSAT population A 102 by being transmitted to the gateway A 101, then to the satellite 106, and then to the VSAT.

The satellite 106 may operate under control of the telemetry, tracking and control (TT&C) station 113, and any other suitable facilities such as, for example, uplink beacon sites. The TT&C station 113 may be connected to the TT&C RFT 114, which may be similar to the RFT A 108 and the RFT B 111, and may used by the TT&C station 113 to communicate with the satellite 106. The TT&C station 113 may monitor and control the operations of the satellite 106, including, for example, the gateway spot beams and the user spot beams.

The satellite communications system may also include, for example, gateway terrestrial network connectivity to a PSTN, private networks or other networks, along with connectivity to the Internet 112, service and network management systems, user equipment, interconnect infrastructure, and other infrastructure and components suitable for a satellite communications system.

Figure 2:
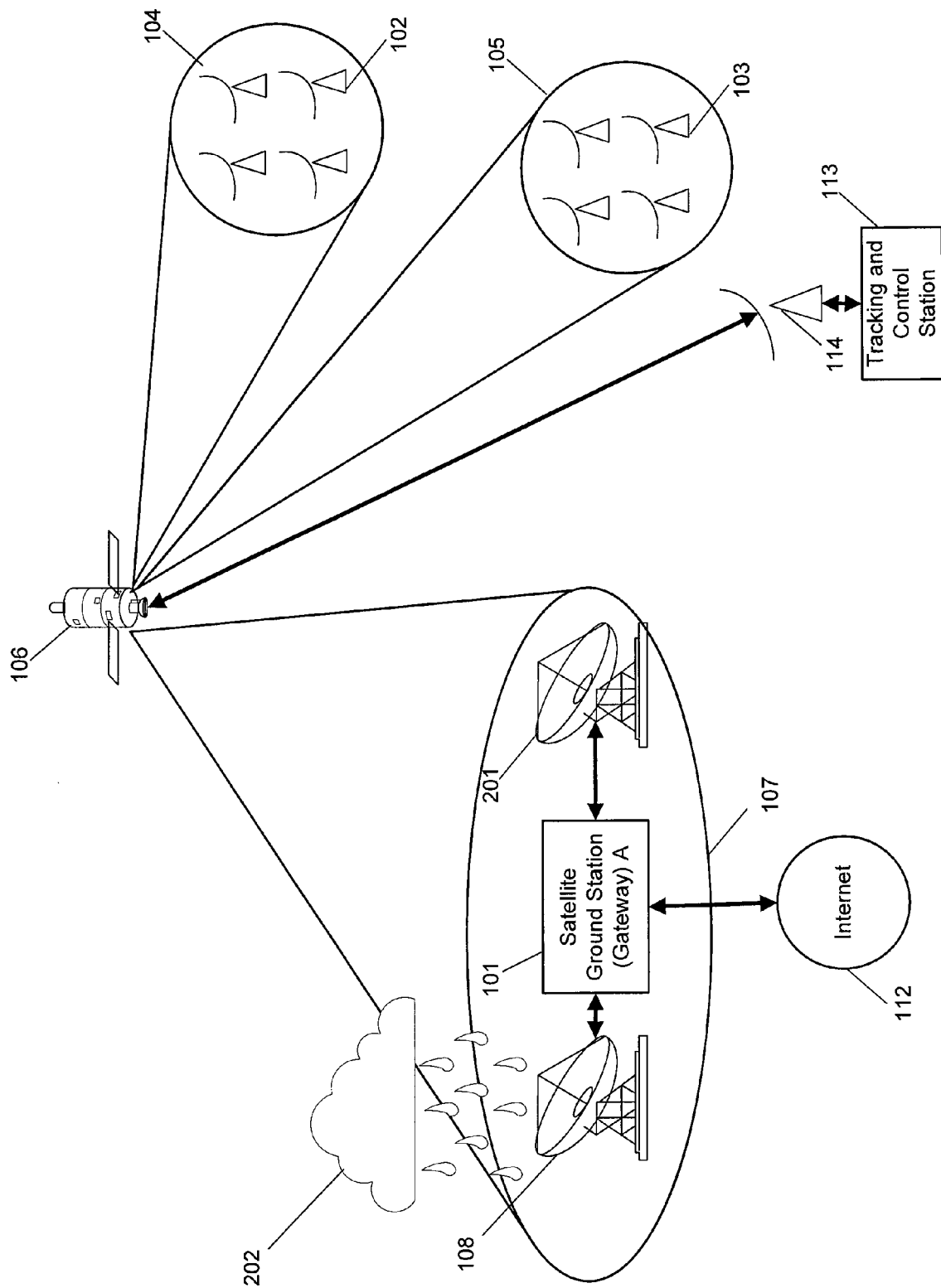
FIG. 2 depicts an exemplary satellite communications system with a gateway with diverse RFTs experiencing service interruption at one of the RFTs.

FIG. 2 depicts an exemplary satellite communications system with a gateway with diverse RFTs experiencing service interruption at one of the RFTs. The VSAT population A 102 may experience service interruption as a result of rain fade attenuation caused by rain 202 in the vicinity of the RFT A 108. The rain 202 may attenuate the signal between RFT A 108 and the satellite 106, preventing the gateway A 101 from communicating with the VSAT population A 102. One prior system for preventing the service interruption caused by the rain 202 may be RF path diversity. A second RFT, the RFT A2 201, may provide a second path to the satellite 106 within the gateway spot beam A 107. Both RFT A 108 and the RFT A1 201 may be connected to gateway A 101, and both may be within gateway spot beam A 107, but the RFT A1 201 may be sufficiently far away from RFT A 108, both in distance and direction, with respect to typical storm size and path for the area, so that the rain 202 is unlikely to cause rain fade at the RFT A1 201 at the same time as at the RFT A 108. The placement of the RFT A1 201 may be constrained by the protocols used to maintain communication channel synchronization with user terminals, the infrastructure available to connect RFT A1 201 to the gateway A 101, and the gateway spot beam A 107 antenna pattern. The terrain covered by the gateway spot beam A 107 may also constrain how far and where RFT A1 201 can be sited from gateway A 101.

As shown in FIG. 2, when the path from gateway A 101 to satellite 106 through RFT A 108 experiences rain fade due to the rain 202 that cannot be overcome by ULPC or other means, or becomes impaired for some other reason, the diverse RF path through RFT A1 201 may automatically be used instead, and vice versa. The decisions to switch the RFT path between RFT A 108 and RFT A1 201 may be made by RFT ULPC systems or other automatic systems in order to minimize service outage.

Figure 3:
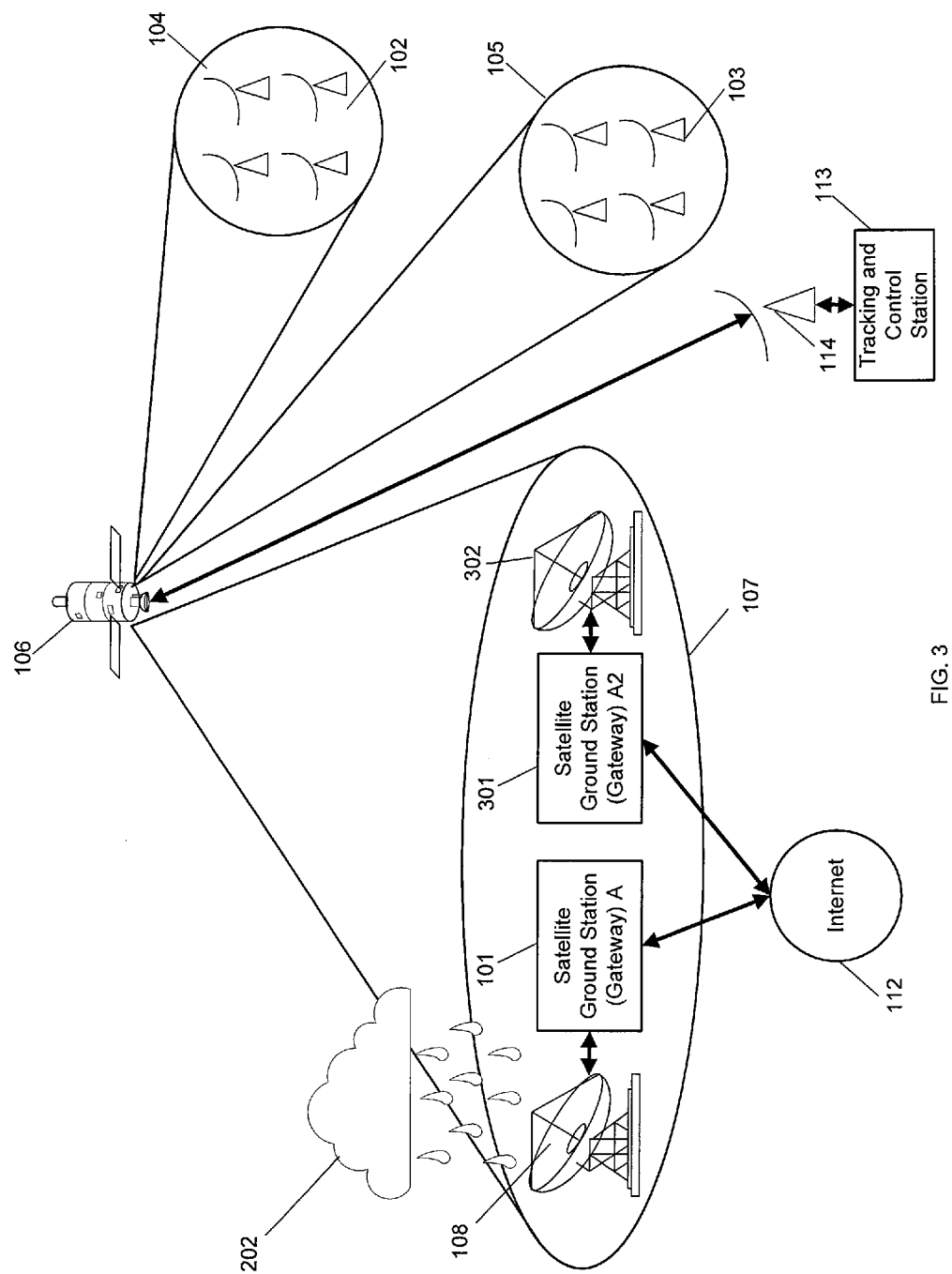
FIG. 3 depicts an exemplary satellite communication system with duplicate gateways in a spot beam.

FIG. 3 depicts an exemplary satellite communication system with duplicate gateways in a spot beam. Instead of adding a second RFT, service interruption for users may be avoided by building a second partial or full gateway within a gateway spot beam. For example, within the gateway spot beam A 107, a gateway A2 301 may be built along with an RFT A2 302. The gateway A2 301 and the RFT A2 302 may be sufficiently far away from the gateway A 101 so as to likely not suffer simultaneous rain fades from the rain 202. In event of rain fade, or some other service interruption, at the gateway A 101, traffic may automatically be switched to the gateway A2 301, and vice versa, to maintain service availability. Diverse gateways may be provided in none, some, or all gateway spot beams, depending on expected rain at a given gateway site and target availability for the service. The gateway A2 301 may provide full access to, for example, the Internet 112, or may be a partial gateway, providing only the RFT A2 302 and modems, and connecting to the gateway A 101 for upper layer protocol processing and terrestrial network access.

The examples of RF diversity, as described in FIGS. 2 and 3, may provide availability at rainy gateway spot beams, but may also suffer from significant costs and constraints. For example, long term rain model data may be necessary to predict the availability of a first gateway and gateway or RFT for providing diversity, and may not be available for some regions where gateway beams may be formed. A gateway or RFT for providing a diversity site may be required to be a few to several tens of kilometers away from the primary gateway site in order to achieve sufficient protection against simultaneous rain fades, and this distance may differ depending on the typical direction of storms in the area Infrastructure limitations may make it difficult to find a cost-effective site on which to construct a duplicate gateway or RFT within the required area, due to lack of facilities, power, communication access, security, licensing, and so on. Interconnect infrastructure availability, latency or performance may limit how far and in which direction a second RFT may be sited from the gateway site. Gateway spot beams must be large enough to enable RF diversity where needed, which may require larger gateway spot beams to accommodate constraints on site location and to meet distance and direction needs for target service availability. A larger gateway spot beam may provide reduced availability and/or capacity for a given RFT size due to the wider focus of the gateway beam at the satellite antenna, and a larger and more expensive RFT may be required to maintain the target capacity and availability. The RF diversity solution may be replicated at multiple gateway sites where necessary to achieve the target service availability, which may result in considerable equipment and operating costs for RF diversity sites.

Figure 4:
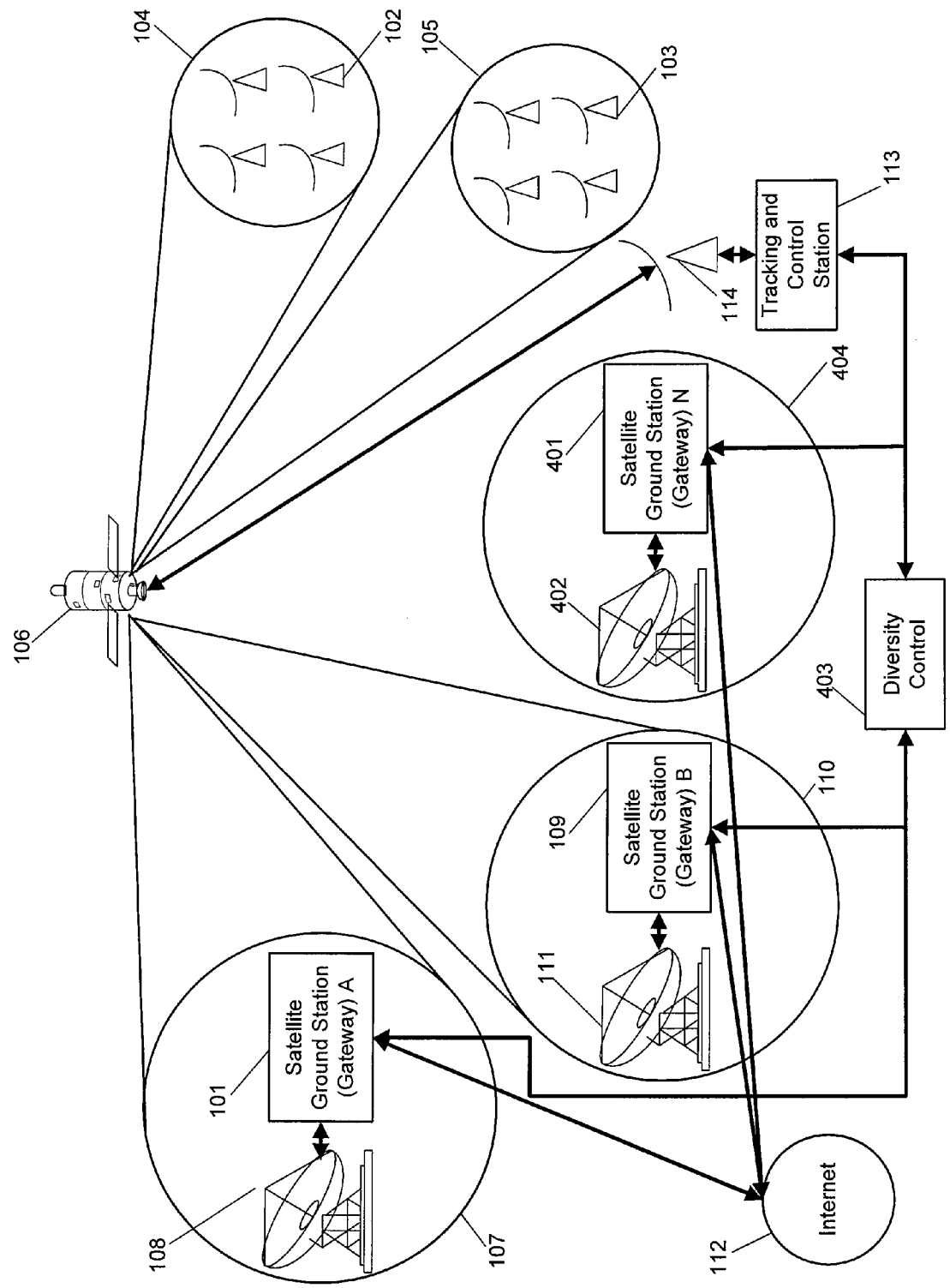
FIG. 4 depicts an exemplary satellite communications system with an RF diversity gateway and diversity control.

FIG. 4 depicts an exemplary satellite communications system with an RF diversity gateway and diversity control. The satellite 106 may connect the VSAT population A 102 with the gateway A 101 using the user spot beam set A 104 and the gateway spot beam A 107. The VSAT population B 103 may be connected to the gateway B 109 with the user spot beam set B 105 and the gateway spot beam B 110. In the satellite 106, the gateway spot beam A 107 may be connected to the user spot beam set A 104, and the gateway spot beam B 110 may be connected the user spot beam set B 105. To provide RF diversity, a gateway N 401 with RFT N 402 may be constructed at a location separate from the gateway A 101 and the gateway B 109. The gateway N 401 and the RFT N 402 may be a diversity gateway, and may be covered by a gateway spot beam N 404. The gateway spot beam N 404 may be an extra gateway spot beam provided on the satellite 106, and may normally not be connected by the satellite 106 to any set of user spot beams. In the event of a service interruption, such as rain fade, at the site of the gateway A 101 or the gateway B 109, the gateway spot beam N 404 may be automatically be connected to the user spot beam set normally connected to the gateway experiencing a service interruption and may provide service to the VSAT population located in those user spot beams using the gateway N 401 and the RFT N 402 located within gateway spot beam N 404. The TT&C STATION 113 may provide the path to configure the desired satellite beam connectivity under direction of a Diversity Control function 403. The Diversity Control function 403 may gather data from each gateway, such as, for example, the gateway A 101, the gateway B 109, and the gateway N 401, and apply policies and other factors to determine whether and when to change satellite beam connectivity to either switch in or switch out the gateway N 401. The Diversity Control function 403 may be located at any gateway site, at the TT&C STATION 113 site, or at some other central system management facility.

Figure 5:
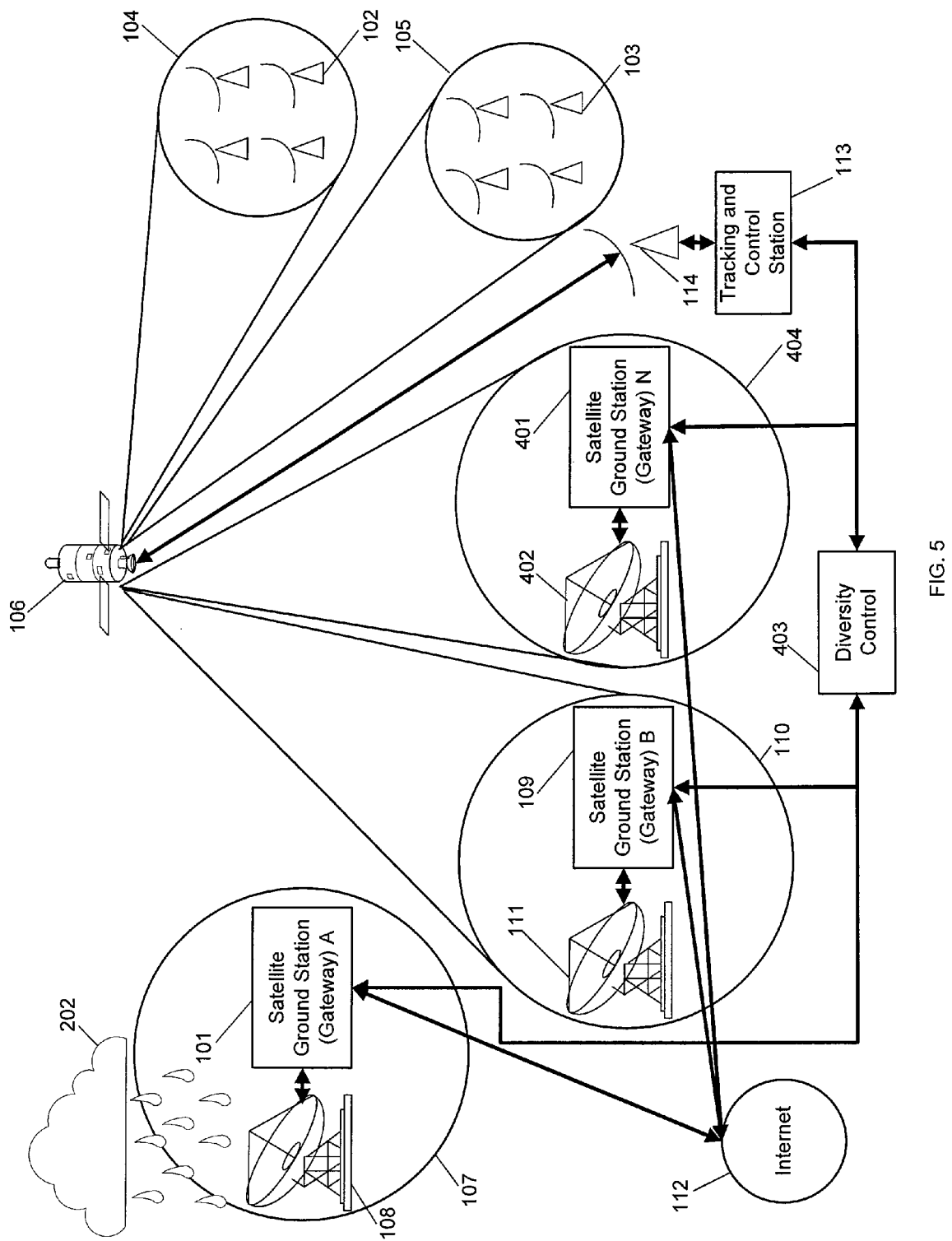
FIG. 5 depicts an exemplary satellite communications system with an RF diversity gateway and diversity control and a first gateway experiencing service interruption.

FIG. 5 depicts an exemplary satellite communications system with an RF diversity gateway and diversity control and a first gateway experiencing service interruption. When the rain 202 causes the gateway A 101 to experience rain fade, the Diversity Control function 403 may determine from ULPC, ACM data or in any other suitable manner that the gateway A 101 is starting to experience a rain fade and that gateway N 401 is operationally available. The Diversity Control function 403 may also be able to determine that gateway N 401 is not experiencing a rain fade. The Diversity Control function 403 may make this determination through measurement at gateway N 401 of a downlink beacon from the satellite 106, provision of a narrowband ULPC loopback path in gateway spot beam N 404 by the satellite 106, analysis of weather radar data for gateway spot beam N 404, application of information from weather monitoring equipment at gateway N 401, application of manually provided weather observations, or in other any other suitable manner. The Diversity Control function 403 may be aware that gateway N 401 is not already being used to provide RF diversity for some other gateway, and may command the TT&C STATION 113 to connect the user spot beam set A 104 to the gateway spot beam N 404. The satellite configuration commands to effect any given candidate switch may have already been prepared for quick upload to the satellite 106, or the command sequence may be automatically constructed and uploaded when required, or each command sequence may be preloaded into the satellite control computer for quickest activation through the TT&C STATION 113. Once the user spot set A 104 has been connected to the gateway spot beam N 404 to maintain service availability for the VSAT population 102, no user spot beam set may be connected to the gateway spot beam A.

Figure 6:
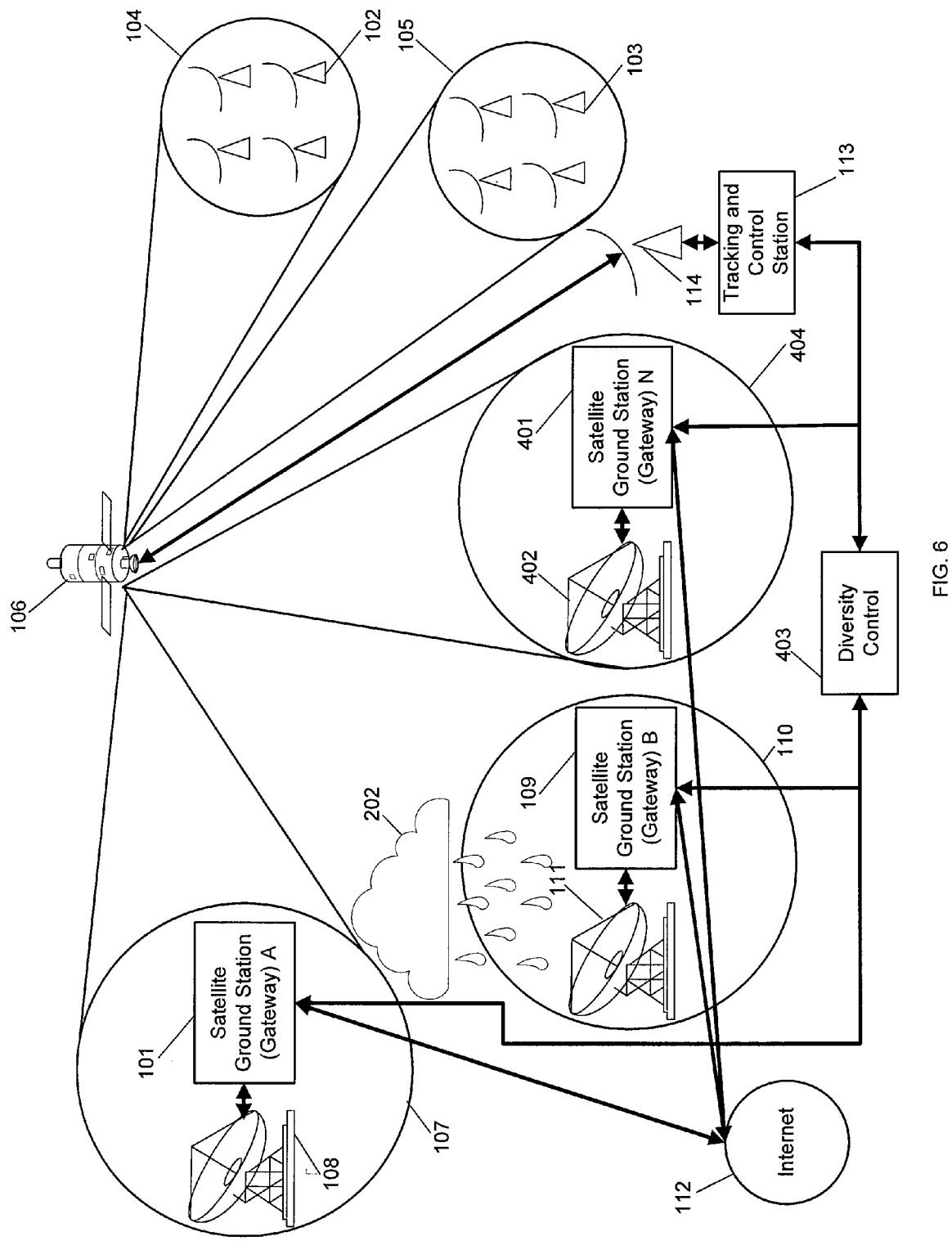
FIG. 6 depicts an exemplary satellite communications system with an RF diversity gateway and diversity control and a second gateway experiencing service interruption.

FIG. 6 depicts an exemplary satellite communications system with an RF diversity gateway and diversity control and a second gateway experiencing service interruption. If the gateway B 109 experiences a service interruption, such as, for example, rain fade due to the rain 202, the Diversity Control function 403 may, as in FIG. 5, detect the rain fade, ascertain the status of the gateway N 401, and connect the user spot beam set B 105 to the gateway spot beam N 404. This may allow for the VSAT population B 103 to receive service through the gateway N 401 while the gateway B 109 is still experiencing rain fade.

Figure 7:
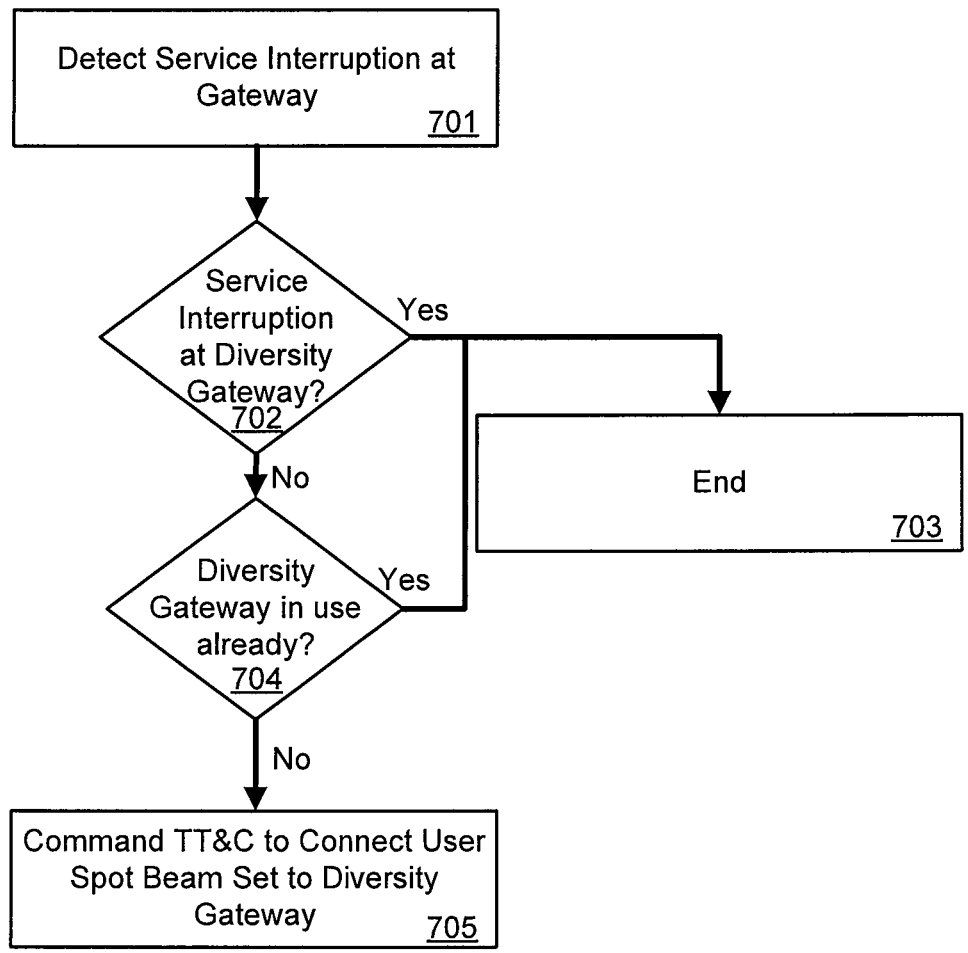
FIG. 7 depicts an exemplary procedure for using an RF diversity gateway when one gateway experiences service interruption.

FIG. 7 depicts an exemplary procedure for using an RF diversity gateway when one gateway experiences service interruption. In block 701, a service interruption may be detected at a gateway. For example, the Diversity Control function 403 may detect or receive notice of rain fade at the gateway A 101, due to the rain 202 being in the vicinity of the gateway A 101 and attenuating the signals to and from the RFT A 108.

In block 702, whether or not there is also a service interruption at a diversity gateway may also be determined. For example, the Diversity Control function 403 may determine if the gateway N 401 is experiencing a service interruption such as rain fade in a any of the manners previously discussed. If the diversity gateway, such as the gateway N 401, is experiencing a service interruption, then flow proceeds to block 703 and ends, as the diversity gateway may be unable to provide service to the VSAT population served by the gateway where a service interruption was detected in block 701. Otherwise, flow proceeds to block 704.

In block 704, whether or not the diversity gateway is already in use may be determined. For example, the Diversity Control function 403 may determine if the gateway N 401 is already providing service to another VSAT population. If the diversity gateway, such as the gateway N 401, is already providing service to another VSAT population, then flow proceeds to block 703 and ends, as the diversity gateway may be unable to provide service to the VSAT population served by the gateway where a service interruption was detected in block 701. Otherwise, flow proceeds to block 705.

In block 705, a command may be issued to a TT&C station to make the satellite connect the user spot beam for the VSAT population with interrupted service to the diversity gateway. For example, after the Diversity Control function 403 determines that the gateway N 401 is available and is not experiencing a service interruption, the Diversity Control function 403 may issue a command to the TT&C station 113 to instruct the satellite 106 to connect the user spot beam A 104 to the gateway spot beam N 404, as depicted in FIG. 5. This may allow the users using the VSAT population A 102 to receive service even when the gateway A 101 cannot provide service.

Figure 8:
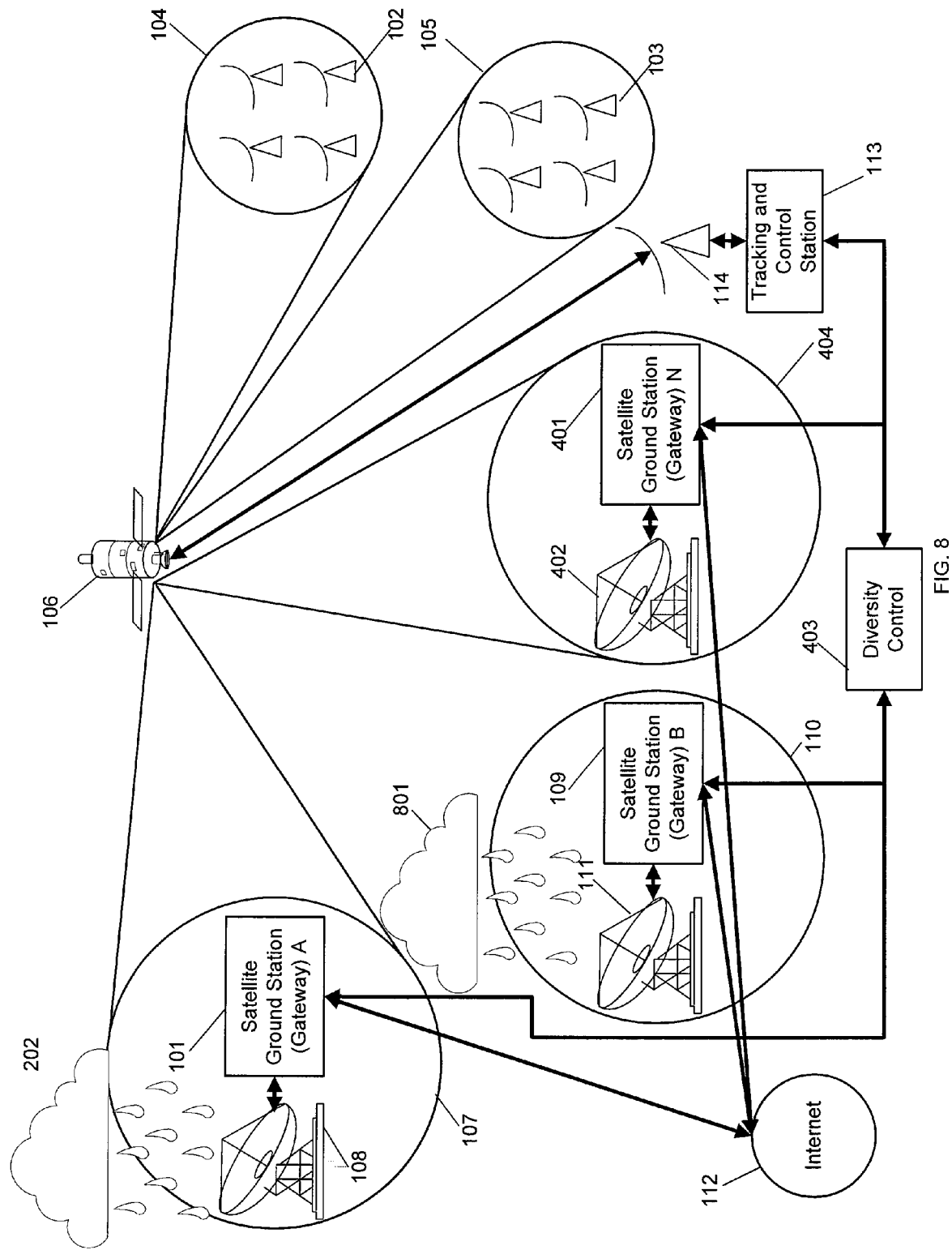
FIG. 8 depicts an exemplary satellite communications system with an RF diversity gateway and diversity control and two gateways experiencing service interruption.

FIG. 8 depicts an exemplary satellite communications system with an RF diversity gateway and diversity control and two gateways experiencing service interruption. There may be times when multiple gateway sites experience service interruptions, such as rain fading, at the same time. It is possible for there to be more gateways experiencing a service interruption that there are diversity gateways to use to mitigate the service interruptions. A satellite communications system with four gateways experiencing a service interruption, but only three diversity gateways, may not be able to redirect the user spot beam sets for each of the gateways experiencing the service interruption to a diversity gateway. When this occurs, a decision may need to be made as to which gateway's user spot beam set will be connected to a diversity gateway to restore service to that gateway's VSAT population, and which gateway's won't. This decision may be made by, for example, the Diversity Control function 403.

For example, the gateway A 101 may experience rain fade due to the rain 202, and at the same time the gateway B 109 may experience rain fade due to the rain 801. The Diversity Control function 403 may determine diversity priority between the gateway spot beam A 107 and the gateway spot beam B 110, based on, for example, gateway signal metrics, policies and other factors. As depicted in FIG. 8, the Diversity Control function 403 may determine that the gateway spot beam B 110 has priority, and may have the TT&C station 113 instruct the satellite 106 to connect the user spot beam set B 105 to gateway spot beam N 404, restoring service to the VSAT population B 103. The user spot beam set A 105 may be left to either suffer a service outage or operate in a degraded fashion if ACM can maintain some of the service links at the gateway A 101.

Figure 9:
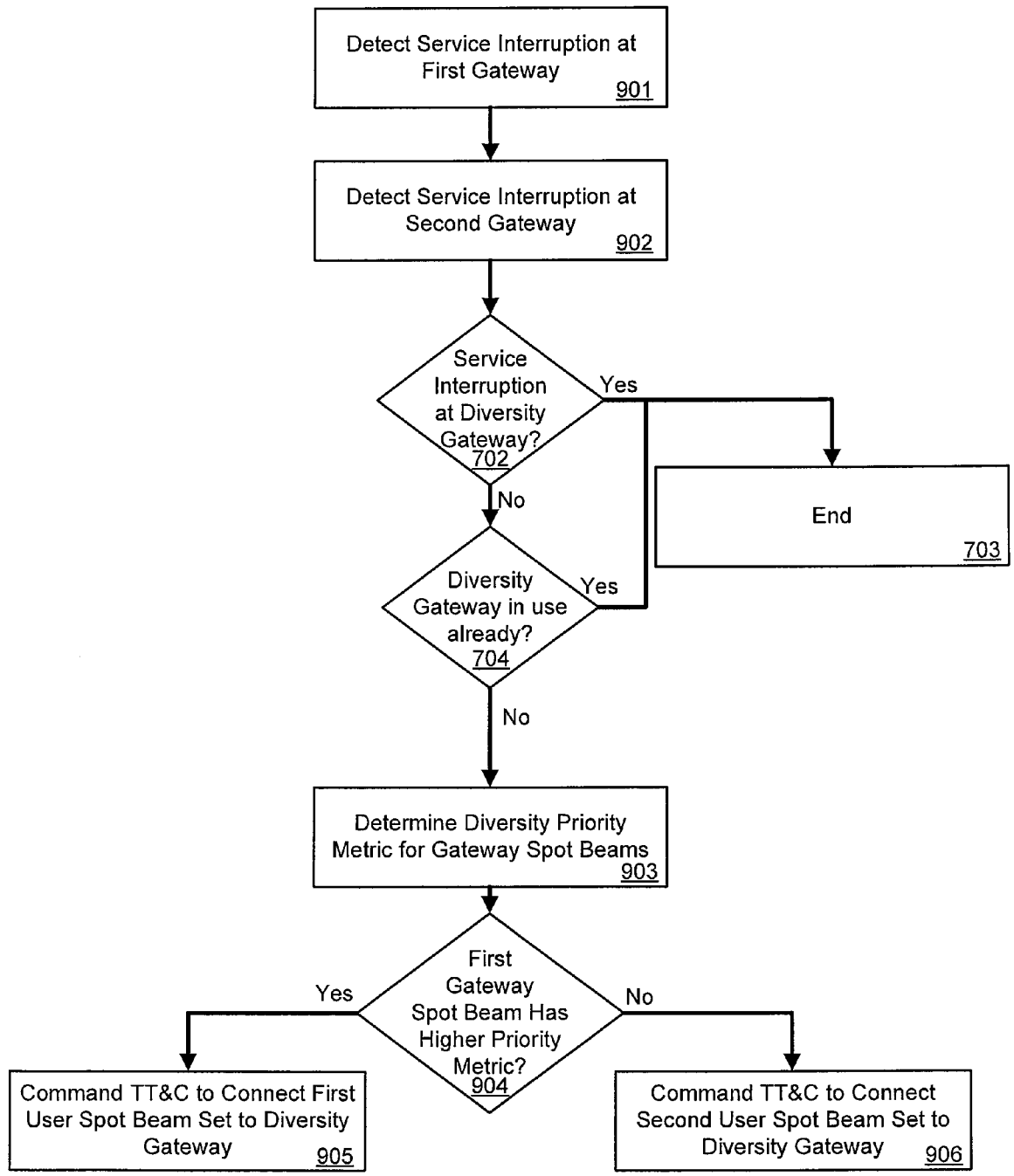
FIG. 9 depicts an exemplary procedure for using an RF diversity gateway site when two gateways experience service interruption.

FIG. 9 depicts an exemplary procedure for using an RF diversity gateway site when two gateways experience service interruption. Blocks 702, 703, and 704 may function similarly to FIG. 7. In block 901, a service interruption may be detected at a first gateway. For example, the Diversity Control function 403, as discussed in FIG. 8, may detect or be informed of a rain fade at the gateway A 101, due to the rain 202 being in the vicinity of the gateway A 101 and attenuating the signals to and from the RFT A 108.

In block 902, a service interruption may be detected at a second gateway. For example, the Diversity Control function 403 may detect or be informed of a rain fade at the gateway B 109, due to the rain 801 being in the vicinity of the gateway B 109 and attenuating the signals to and from the RFT B 111.

In block 702, whether or not there is also a service interruption at a diversity gateway may also be determined, as in FIG. 7. If the diversity gateway is experiencing a service interruption, then flow proceeds to block 703 and ends, otherwise, flow proceeds to block 704.

In block 704, whether or not the diversity gateway is already in use may be determined, as in FIG. 7. If the diversity gateway is already providing service to another VSAT population, then flow proceeds to block 703 and ends, otherwise, flow proceeds to block 903. Alternatively, priorities may be used to determine whether to preempt the user spot beam set already being served by the diversity gateway in favor of a different user spot beam set.

In block 903, a diversity priority metric may be determined for the gateway spot beams. The Diversity Control function 403 may determine a diversity priority metric for the gateway spot beams for the gateways experiencing a service interruption. For example, the Diversity Control function 403 may determine the diversity priority metric for the gateway spot beam A 107 for the gateway A 101, and for the gateway spot beam B 110 for the gateway B 109. The diversity priority metric may be determined using any suitable factors, including, for example, gateway signal metrics, historical and policy factors, operator controls and other factors. The Gateway signal metrics may include ULPC metrics (uplink power level, difference from normal operating point, remaining margin, direction and rate of change), downlink power metrics (average burst power, difference from normal operating averages, average margin, direction and rate of change), ACM metrics (average and distribution of modulation/code points, difference from normal operating averages, average margin, direction and rate of change), and traffic metrics (average throughput and retransmission rate, difference from expected levels, direction and rate of change). Historical factors may include, for example, duration of an ongoing fade at a gateway site and typical fade duration for a gateway site (versus time and impact to switch), with hysteresis applied to smooth out transient signal metric effects during onset and end of a rain storm. Policy factors may include the number of users affected, average traffic level affected, gateway or user priorities in event of differing service level agreements, or national restrictions on traffic landing that may require a user spot beam set to be switched only to a gateway spot beam within the same country or within a certain country or countries. Operator controls may include the authority of a human operator to direct one of the user spot beam sets to be prioritized over another, or to force or restrict diversity switching in support of other redundancy or maintenance requirements. Other factors may include assessing the intensity and size of a storm, for example, with processed weather radar data, to estimate how much longer a rain fade may last at a particular gateway.

In block 904, whether the first gateway spot beam has a higher priority metric may be determined. The priority metrics determined for the gateway spots beams for the first gateway and second gateways experiencing a service interruption may be compared. For example, the Diversity Control function 403 may compare the priority metrics determined for the gateway spot beam A 107 and the gateway spot beam B 110. If the first gateway spot beam, for example, the gateway spot beam A 107, has a higher priority metric, flow proceeds to block 905. Otherwise, flow proceeds to block 906.

In block 905, a command may be issued to a TT&C station to have the satellite connect the user spot beam that was connected to the first gateway to the diversity gateway. Because the first gateway spot beam had a higher priority metric, as determined in block 904, the diversity gateway may be used to provide service to the VSAT population that was being served by the first gateway. For example, the Diversity Control function 403 may issue a command to the TT&C station 113 to instruct the satellite 106 to connect the user spot beam A 104 to the gateway spot beam N 404. This may allow the users using the VSAT population A 102 to receive service even when the gateway A 101 cannot provide service. The users in the VSAT population B 103 may continue to have their service interrupted if there is no other gateway spot beam to which to connect the user spot beam B 105, because the gateway spot beam B 110 had a lower priority metric.

In block 906, a command may be issued to a TT&C station to have the satellite connect the user spot beam that was connected to the second gateway to the diversity gateway. Because the second gateway spot beam had a higher priority metric, as determined in block 904, the diversity gateway may be used to provide service to the VSAT population that was being served by the second gateway. For example, the Diversity Control function 403 may issue a command to the TT&C station 113 as in block 905, except for the user spot beam B 105 instead of the user spot beam A 104. The user spot beam B 105 may be connected to the gateway spot beam N 404, as depicted in FIG. 8. The VSAT population B 103 may then be able to received service, while the VSAT population A 102 may still have interrupted service.

The satellite communications system may employ any number of gateways and diversity gateways. For example, there may be a ratio of one diversity gateway for every two gateways, throughout the system. Multiple diversity gateway spot beams and diversity gateways may be used to provide, for example, M:N protection whereby M diversity gateways protect N gateways, or to provide multiple sets of 1:N protection whereby one diversity gateway protects N gateway sites, and another diversity gateway protects another N gateways, and so on.

Through the provision and use of appropriate switching in the satellite 106, any gateway may be designated as a diversity gateway. For example, in FIG. 6, after gateway N 401 has substituted for gateway B 109, the rain event 202 may end. Rather than returning the gateway B 109 to service for the user spot beam set 105 through appropriate switching in the satellite 106 and on the ground, gateway N 401 may continue to serve user spot beam set 105. Later, should gateway A 101 be affected by a rain fade or other impairment, gateway B 109 may be switched to substitute for it.

A diversity gateway, such as the gateway N 401, may also be used to offer service to a user spot beam set that would otherwise not be served in the event of delays in procuring, installing and activating a gateway site in a particular primary gateway spot beam.

When preventive maintenance at a gateway site that would otherwise disrupt user traffic for the assigned user spot beam set is performed, for example periodic RFT antenna maintenance, a diversity gateway spot beam and diversity gateway may be used to carry the user service while the preventive maintenance is underway, which may be a less costly way to maintain service availability than equipping a second antenna at each gateway site or employing a very large transportable antenna.

In the event of a disaster at a gateway site that would otherwise disrupt user service for an extended time and that is not recoverable through other redundancy means, for example an earthquake, flood or other natural disaster, extended loss of power or cooling capability, loss of terrestrial network connectivity, act of terrorism or conflict, strike or personnel action, or other site-specific reasons, the user spot beam set may be served through a diversity gateway spot beam and diversity gateway until the primary site is ready for service.

In the exemplary system of FIG. 8, the first gateway A 101, the second gateway B 109, and the diversity gateway N 401 may all be connected to the Internet 112 and may provide communications connectivity between VSATs and the Internet 112. Traffic destined to a VSAT may be routed by the Internet 112 to the proper gateway using one or more Internet Protocol (IP) subnet addresses, whether IP version 4 (IPv4), IP version 6 (IPv6), or both. If the user spot beam set A 104 is connected to gateway A 101, the IP subnet addresses used by the Internet 112 to send traffic to a given VSAT in the user spot beam set A 104 may come from those routed to the gateway A 101. While the user spot beam set A 104 is connected to the diversity gateway N 401, the IP subnet addresses used by the Internet 112 to send traffic to that same VSAT may come from those routed to the gateway N 401. This may be accomplished by using dynamic addressing, wherein a VSAT may be assigned IP subnet addresses from within ranges associated with the gateway through which the VSAT is connected to the Internet 112. This may also be accomplished by using static addressing, wherein a VSAT IP subnet address remains the same irrespective of through which gateway the VSAT may be connected to the Internet 112, but a protocol such as the Border Gateway Protocol (BGP) may be used to automatically change the Internet 112 destination routing for that address to the gateway through which the VSAT is then connected. BGP may be impractical for short rain fades for VSATs using static address plans due to the amount of time it may take for a routing change for a static address to converge within the Internet 112.

Figure 10:
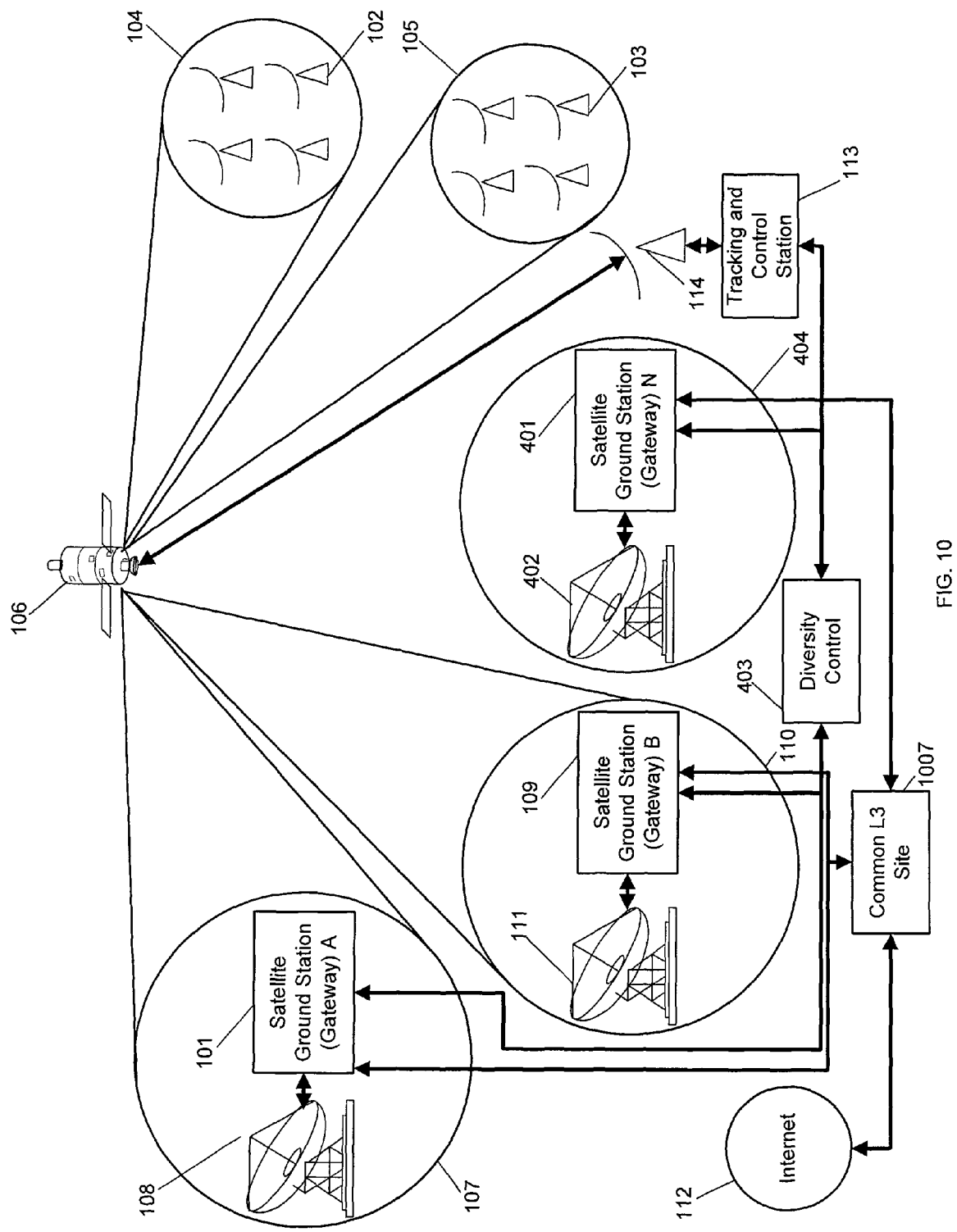
FIG. 10 depicts an exemplary alternative system using a configurable spot beam satellite to achieve RF diversity with benefits for static IP addressing plans.

FIG. 10 depicts an exemplary alternative system using a configurable spot beam satellite to achieve RF diversity with benefits for static IP addressing plans. In FIG. 10, the gateway A 101 may provide service to the user spot beam set A 104 through the satellite 106, the gateway B 109 may provide service to the user spot beam set B 105 through the satellite 106, and the diversity gateway N 401 may provide RF diversity protection for both the gateway A 101 and the gateway B 109 under management of the diversity control function 403. A common L3 site 1007 may serve as an IP protocol and addressing intermediary between the Internet 112 and the gateway stations. Return link traffic may be received by the gateways from the satellite 106 and may be forwarded over backhaul links to the common L3 site 1007, from which that traffic may be forwarded to the Internet 112. Forward direction traffic may be received from the Internet 112 by the common L3 site 1007, and forwarded to the appropriate gateway station for transmission over the forward link to the satellite 106. In this manner, dynamic and static IP address plans may be supported by the system without requiring time for BGP routing change convergence in the Internet when service of a VSAT with a static subnet address is moved from one gateway to another for RF diversity or other reasons.

It may be recognized by those experienced in the art that a hybrid connectivity scheme might provide optimal cost and performance, with direct connectivity from each gateway to the Internet used for traffic for VSATs using dynamic subnet addresses, and centralized connectivity to the Internet via a common L3 site being used for VSATs using static subnet addresses. Such a hybrid configuration may minimize backhaul costs while making feasible RF diversity using a configurable spot beam satellite for VSATs with static address plans.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A system for gateway RF diversity using a configurable spot beam satellite comprising:
    a satellite;
    a first gateway connected to a first VSAT population through the satellite by a first gateway spot beam and a first user spot beam set comprising at least one user spot beam;
    a second gateway connected to a second VSAT population through the satellite by a second gateway spot beam and a second user spot beam set comprising at least one user spot beam:
    a diversity gateway located outside of the first gateway spot beam for the first gateway; and
    a diversity control function;
    wherein the diversity control function is configured to command the satellite to connect the first user spot beam set for the first gateway to a diversity gateway spot beam when the first gateway experiences service interruption, and
    wherein the diversity control function is further configured to determine diversity priority metrics for the first gateway spot beam and a second gateway spot beam and command the satellite to connect at least one user spot beam set for the gateway whose corresponding gateway spot beam has the higher diversity priority metric to the diversity gateway spot beam when the first gateway and the second gateway both experience service interruptions.

2. The system of claim 1,
    wherein the diversity control function is further configured to command the satellite to connect the first user spot beam set to the diversity gateway spot beam when the first gateway experiences service interruption and the second gateway does not experience a service interruption, and connect the second user spot beam set to the diversity gateway spot beam when the second gateway experiences service interruption and the first gateway does not experience service interruption.

3. The system of claim 1, wherein the satellite is a configurable bent pipe spot beam satellite.

4. The system of claim 1, wherein the satellite is a configurable regenerative spot beam satellite.

5. The system of claim 1 further comprising a telemetry, tracking and control station.

6. The system of claim 1, wherein service interruption is caused by at least one of rain fade, a natural disaster, a loss of required power, cooling, access, terrestrial connectivity, or management connectivity facilities, an act of terrorism, a conflict, disruptive preventative maintenance and personnel action.

7. The system of claim 1, further comprising a telemetry, tracking and control station, wherein the diversity control function commands the satellite through the telemetry, tracking, and control station.

8. The system of claim 1, further comprising:
an additional gateway within the first gateway spot beam.

9. The system of claim 1, wherein the diversity control function is automated and the connecting of the first user spot beam to the diversity gateway spot beam is performed according to an automated procedure.

10. The system of claim 1, wherein the diversity control function determines diversity priority metrics based on at least one of:
gateway signal metrics comprising at least one of:
current uplink power control metrics comprising at least one of uplink power level, difference from normal operating point, remaining margin and direction and rate of change,
current downlink power metrics comprising at least one of average burst power, difference from normal operating averages, average margin, and direction and rate of change,
current adaptive coding and modulation metrics comprising at least one of average and distribution of current user terminal modulation/code points, difference from normal operating averages, average margin, direction and rate of change,
and
current traffic metrics comprising at least one of average throughput, retransmission rate, difference from expected levels, direction and rate of change,
historical factors comprising at least one of duration of an ongoing fade at a gateway site, typical fade duration for a gateway site, application of hysteresis to smooth out transient signal metric effects during onset, progression and end of a storm,
policy factors comprising at least one of number of users affected, average traffic level affected, gateway or user priorities in event of different service level agreements, and national restrictions on traffic landing,
weather metrics comprising at least one of weather radar data, remotely monitored rainfall measurement stations, or manually initiated weather observations,
and
a priori operator controls comprising at least one of direction to prioritize one set of user spot beams over another, and directions to force or restrict spot beam connectivity switching to support other redundancy or maintenance requirements.

11. The system of claim 1, further comprising two or more diversity gateways, each within a gateway spot beam able to be connected by the satellite to any of two or more user spot beam sets or to any spot beam set within a designated group of user spot beam sets.

12. The system of claim 1, wherein any of the gateways may serve as the diversity gateway, wherein the satellite is configured to connect any gateway spot beam to any user spot beam set or any of a number of user spot beam sets, and wherein the diversity control function is configured to monitor, prioritize and command diversity assignments for the gateways.

13. The system of claim 1, further comprising a common L3 site connected via backhaul link to the first gateway and the diversity gateway, wherein the common L3 site is configured to provide common Internet connectivity for the first gateway and the diversity gateway and allow VSAT connectivity to be switched between the gateways for RF diversity, while preserving established Internet routing for static IP subnet addresses associated with the VSATs.

14. The system of claim 13, wherein the first gateway and the diversity gateway are connected both to the Internet and to the common L3 site and wherein traffic for VSATs with dynamic subnet addresses is exchanged directly between the Internet and gateway, and traffic for VSATs with static subnet addresses is exchanged by way of the common L3 site.

15. A method for gateway RF diversity using a configurable spot beam satellite comprising:
detecting service interruption at a first gateway;
determining that a diversity gateway is available;
commanding a satellite to connect a first user spot beam set for the first gateway to a diversity gateway spot beam for the diversity gateway;
determining a diversity priority metric for a first gateway spot beam for the first gateway and for a second gateway spot beam for a second gateway; and
commanding the satellite to connect at least one user spot beam set for the gateway whose corresponding gateway spot beam has the higher diversity priority metric to the diversity gateway spot beam when the first gateway and the second gateway both experience service interruptions.

16. The method of claim 15, wherein commanding a satellite comprises:
transmitting instructions to a telemetry, tracking and control station to be implemented by configuring the satellite.

17. The method of claim 15, wherein the determining and commanding are automated.

18. The method of claim 15, further comprising:
providing service to a VSAT population that had been served by the first gateway with the diversity gateway after commanding the satellite to connect the first user spot beam to the diversity gateway spot beam.

19. A method for gateway RF diversity using a configurable spot beam satellite comprising:
detecting service interruption at a first gateway;
detecting service interruption at a second gateway;
determining that a diversity gateway is available;
determining a diversity priority metric for a first gateway spot beam for the first gateway and for a second gateway spot beam for the second gateway; and
commanding a satellite to connect a first user spot beam set for the first gateway to a diversity gateway spot beam for the diversity gateway if the diversity priority metric for the first gateway spot beam is higher than the diversity priority metric for the second gateway spot beam or commanding the satellite to connect the second user spot beam set for the second gateway to the diversity gateway spot beam for the diversity gateway if the diversity priority metric for the first gateway spot beam is not higher than the diversity priority metric for the second gateway spot beam.

20. The method of claim 19, wherein determining the diversity priority metric for the first gateway spot beam and the second gateway spot beam is based on at least one of gateway metrics, historical factors, policy factors, weather metrics, operator controls, and weather metrics.

21. The method of claim 19, where commanding the satellite further comprises transmitting instructions to a telemetry, tracking and control station.

22. The method of claim 19, wherein service interruption is caused by at least one of rain fade, a natural disaster, a loss of required power, cooling, access, terrestrial connectivity, or management connectivity facilities, an act of terrorism, a conflict, disruptive preventative maintenance and personnel action.

23. A system for gateway RF diversity using a configurable spot beam satellite comprising:
 a satellite;
 a first gateway connected to a first VSAT population through the satellite by a first gateway spot beam and a first user spot beam set comprising at least one user spot beam;
 a diversity gateway located outside of the first gateway spot beam for the first gateway;
 a diversity control function; and
 a common L3 site connected via backhaul link to the first gateway and the diversity gateway,
 wherein the diversity control function is configured to command the satellite to connect the first user spot beam set for the first gateway to a diversity gateway spot beam when the first gateway experiences service interruption,
 wherein the common L3 site is configured to provide common Internet connectivity for the first gateway and the diversity gateway and allow VSAT connectivity to be switched between the gateways for RF diversity, while preserving established Internet routing for static IP subnet addresses associated with the VSATs,
 wherein the first gateway and the diversity gateway are connected both to the Internet and to the common L3 site and wherein traffic for VSATs with dynamic subnet addresses is exchanged directly between the Internet and gateway, and traffic for VSATs with static subnet addresses is exchanged by way of the common L3 site.

* * * * *